United States Patent
Srinivasan et al.

(10) Patent No.: US 7,705,490 B2
(45) Date of Patent: Apr. 27, 2010

(54) INTEGRAL STACK COLUMNS

(75) Inventors: Ramesh Srinivasan, Chennai (IN); Ranganathan Gurunathan, Chennai (IN)

(73) Assignee: Bloom Energy Corporation, Sunnyvale, CA (US)

( * ) Notice: Subject to any disclaimer, the term of this patent is extended or adjusted under 35 U.S.C. 154(b) by 379 days.

(21) Appl. No.: 11/797,708

(22) Filed: May 7, 2007

(65) Prior Publication Data

US 2008/0278968 A1    Nov. 13, 2008

(51) Int. Cl.
*H02J 1/00* (2006.01)
*H02J 1/10* (2006.01)

(52) U.S. Cl. .............. 307/71; 307/43; 307/77; 307/82

(58) Field of Classification Search .......... 307/43, 307/77, 82, 71
See application file for complete search history.

(56) References Cited

U.S. PATENT DOCUMENTS

| | | | |
|---|---|---|---|
| 3,323,032 A * | 5/1967 | Agarwal et al. | ............. 318/801 |
| 4,409,537 A | 10/1983 | Harris | |
| 5,932,995 A | 8/1999 | Wagoner | |
| 6,497,974 B2 | 12/2002 | Fuglevand | |
| 6,608,404 B2 | 8/2003 | Schienbein et al. | |
| 2006/0152085 A1* | 7/2006 | Flett et al. | ...................... 307/75 |
| 2007/0046250 A1* | 3/2007 | Freiman et al. | ............. 320/101 |
| 2007/0196704 A1 | 8/2007 | Valensa | |
| 2007/0216452 A1* | 9/2007 | Matsumoto et al. | ......... 327/116 |
| 2007/0262648 A1 | 11/2007 | McKenzie | |

FOREIGN PATENT DOCUMENTS

| | | |
|---|---|---|
| JP | 2003-134691 A | 5/2003 |
| JP | 2004-056989 A | 2/2004 |
| KR | 10-2004-78832 A | 9/2004 |

OTHER PUBLICATIONS

U.S. Appl. No. 11/656,006, filed Jan. 22, 2007, K.R. Sridhar.
U.S. Appl. No. 11/797,707, filed May 7, 2007, Ranganathan Gurunathan et al.
Matsuo et al., "Characteristics of the Multiple-Input DC-DC Converter," IEEE Transactions on Industrial Electronics, Jun. 2004, 51(3):625-631.
Ozpineci et al., "Integrating Multiple Solid Oxide Fuel Cell Modules," 2003 IEEE IECON Conference, Nov. 2-6, 2003, 2:1568-1573.
Ozpineci et al., "Multiple Input Converters for Fuel Cells," 2004 IEEE IAS Conference, Oct. 3-7, 2004, 2:791-797.

* cited by examiner

*Primary Examiner*—Fritz M Fleming
*Assistant Examiner*—Dru M Parries
(74) *Attorney, Agent, or Firm*—Foley & Lardner LLP

(57) ABSTRACT

Systems and methods for power conversion are illustrated. Power conversion architecture for fuel cell systems in particular are described that use dual bus architectures having stack segment pairs and a center-tapped neutral line, and/or an architecture employing integer multiple of three DC/DC converter branches.

13 Claims, 3 Drawing Sheets

INTEGRAL STACK COLUMNS

BACKGROUND OF THE INVENTION

The present invention relates generally to the field of power conversion systems. More particularly, embodiments of the present invention employ various architectures of power conversion systems and various methods to convert power. Still more particularly, embodiments of the present invention relate to power conversion systems for power generated by fuel cells.

Fuel cell systems are currently being used in a variety of power supply applications. If an application requires a particular voltage or current, fuel cells are combined into units called "stacks" in which the fuel cells are electrically connected in series to meet the requirements. A generalization of a fuel cell stack is the so-called fuel cell segment or column, which can contain one or more fuel cell stacks. In certain applications, many fuel cell segments may be required for higher power due to the limitation of current carrying capability of the fuel cells. For reliable operation, individual stack current can be controlled, to improve fuel utilization.

Fuel cells generate power that is converted in a fuel cell power conversion system, also known as a power conditioning system. A power conversion system is a system that alters the characteristics of power produced by a source in some way. For the case of fuel cells, which generate DC (direct current) power, this can mean the conversion of the DC power to different voltage and/or current levels, the conversion to AC (alternating current) power with a particular RMS (root mean squared) voltage, the generation of three-phase AC power, or all of the above. Typically, a change in the voltage level of a DC source can be accomplished using a DC/DC (direct current/direct current) converter, whereas the change from DC to AC is accomplished using a DC/AC (direct current/alternating current) converter or inverter.

The expected increase in fuel cell use in the future, in terms of both volume and number of applications, requires that the design and construction of fuel cell power systems be made as efficient as possible. To facilitate the design and manufacturing of fuel cell power control systems, it is advantageous to allow design flexibility while minimizing the number of components required to produce such an architecture.

SUMMARY OF THE INVENTION

As discussed hereinafter, one embodiment of the invention employs a power conversion system that is constructed with a two-bus approach and center-tapped neutral line. Such an embodiment is used to facilitate a modular approach and control of power drawn from the fuel cell stack by the power conversion system. Furthermore, it is advantageous in some embodiments to have a fuel cell power conversion system where the number of individually wired stack columns in a fuel cell hot box is evenly divisible by 3 and 2 (meaning evenly divisible by 6) in order to achieve an optimum power electronics architecture.

One exemplary embodiment relates to a fuel cell circuit, comprising: a first fuel cell segment having positive and negative terminals; a second fuel cell segment having positive and negative terminals; a neutral line; and wherein the negative terminal of the first fuel cell segment is electrically connected to both the positive terminal of the second fuel cell segment and the neutral line.

Another embodiment relates to a power conversion module, comprising: a plurality of DC/DC converter branches, each branch comprising a DC/DC converter; and a plurality of series connections comprising two fuel cell segments; wherein each DC/DC converter branch is connected to at most one of the series connections comprising two fuel cell segments; and wherein the total number of DC/DC converter branches is an integer multiple of three.

Yet another embodiment relates to a method for converting DC to AC, comprising accepting a first output of a first series connection comprising two fuel cell segments at an input of a first DC/DC converter; accepting a second output of a first series connection comprising two fuel cell segments at an input of a second DC/DC converter; accepting a first output of the first DC/DC converter at a first input of a first inverter; accepting a first output of the second DC/DC converter at a second input of the first inverter; and generating a first AC output from the first and second inputs of the first inverter relative to a neutral line connected to a reference potential.

DETAILED DESCRIPTION OF THE PREFERRED EMBODIMENTS

Figure 1:
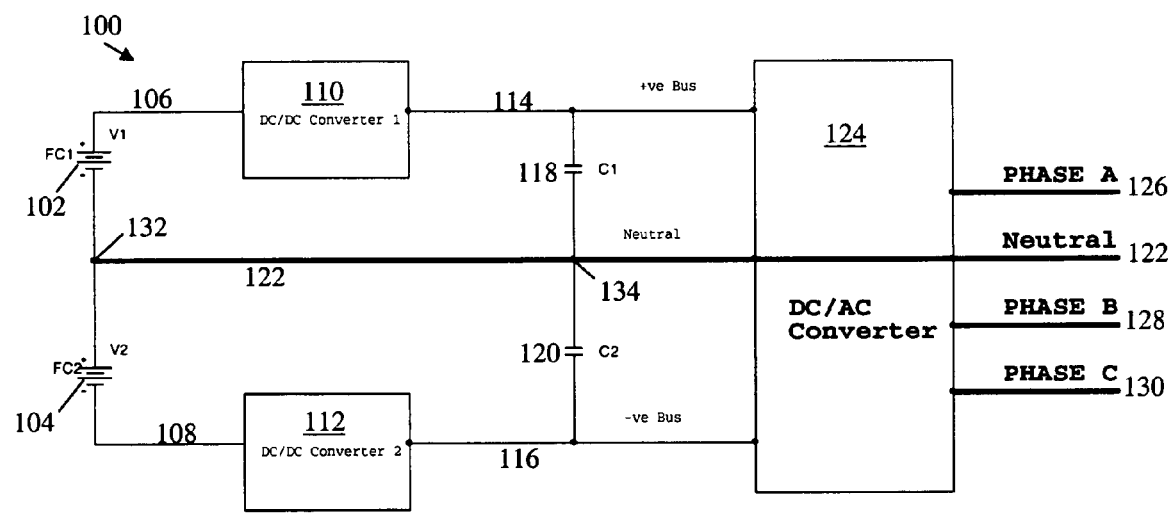
FIG. 1 is a block cell circuit diagram illustrating a fuel cell power conversion system architecture embodiment.

Referring to FIG. 1, a fuel cell power conversion system architecture embodiment 100 with two parallel busses is shown. The architecture 100 is illustrated from fuel cells to three-phase power output, and may be referred to as a type of power conversion module, where "module" is a general term referring to a group of system components. The system 100 comprises two fuel cell segments 102 and 104 containing one or more fuel cells and having respective connections 106 and 108 to DC/DC converters 110 and 112. DC/DC converters 110 and 112 are similar converters. They are usually boost converters. DC/DC converters 110 and 112 have respective output busses 114 and 116, referred to hereinafter as the +ve and −ve busses, respectively. Each circuit branch having a DC/DC converter and extending, for example, from connection 106 through DC/DC converter 110 and ending with bus 114 may be referred to as a DC/DC converter branch. If the fuel cell segments are included, the terminology "stack column" or "segment column" may be used.

The fuel cell segments 102 and 104 are connected in series at node 132, which is also connected to neutral line 122. Node 132 highlights that possibility that fuel cells, stacks and segments of the herein described embodiments can be individually wired, which allows a system designer to advantageously connected mid-cell, mid-stack and mid-segment potentials to a system bus. Here, "individually wired" means that the fuel cell or stack end plates which normally comprise the terminals of a fuel cell or stack are not electrically connected by face to face contact with other end plates, but are rather electrically connected by a conductor, such as a wire.

The output of DC/DC converter 110 is connected to +ve bus 114, which is connected over a voltage drop of +ve by capacitor 118 to node 134, which is connected to and at the same potential as neutral line 122. The output of DC/DC converter 112 is similarly connected to −ve bus 116, which is connected over a voltage drop of −ve by capacitor 120 to node 134. Capacitors 118 and 120 also serve to smooth AC components of the signals carried by +ve bus 114 and −ve bus 116, known as "ripple currents".

The +ve bus 114 and −ve bus 116 serve as inputs to DC/AC converter or inverter 124, which generates three-phase outputs 126, 128 and 130. The three-phase outputs have a desired RMS (root mean-squared) potential over neutral line 122 and 120 degree phase offsets relative to one another. In the embodiment 100, all three phases are generated by DC/AC converter or inverter 124, although this is not strictly necessary. Neutral 122 is already efficiently provided by the dual bus architecture.

The split fuel cell connection as shown with fuel cell segments 102 and 104 provides high efficiency for a power conversion system with its dual bus architecture. The split bus provides a neutral and facilitates easy paralleling of converters. The efficiency of the architecture derives from the fact that two fuel cell segments 102 and 104 are used, which facilitates the construction of counterpoised +ve and −ve busses 114 and 116 respectively and the easy generation of a neutral line 122 between the two. It will be apparent that the dual bus architecture may be multiplied and extended to systems involving integral multiples of fuel cell stack systems arranged according to the configuration of FIG. 1.

Figure 2:
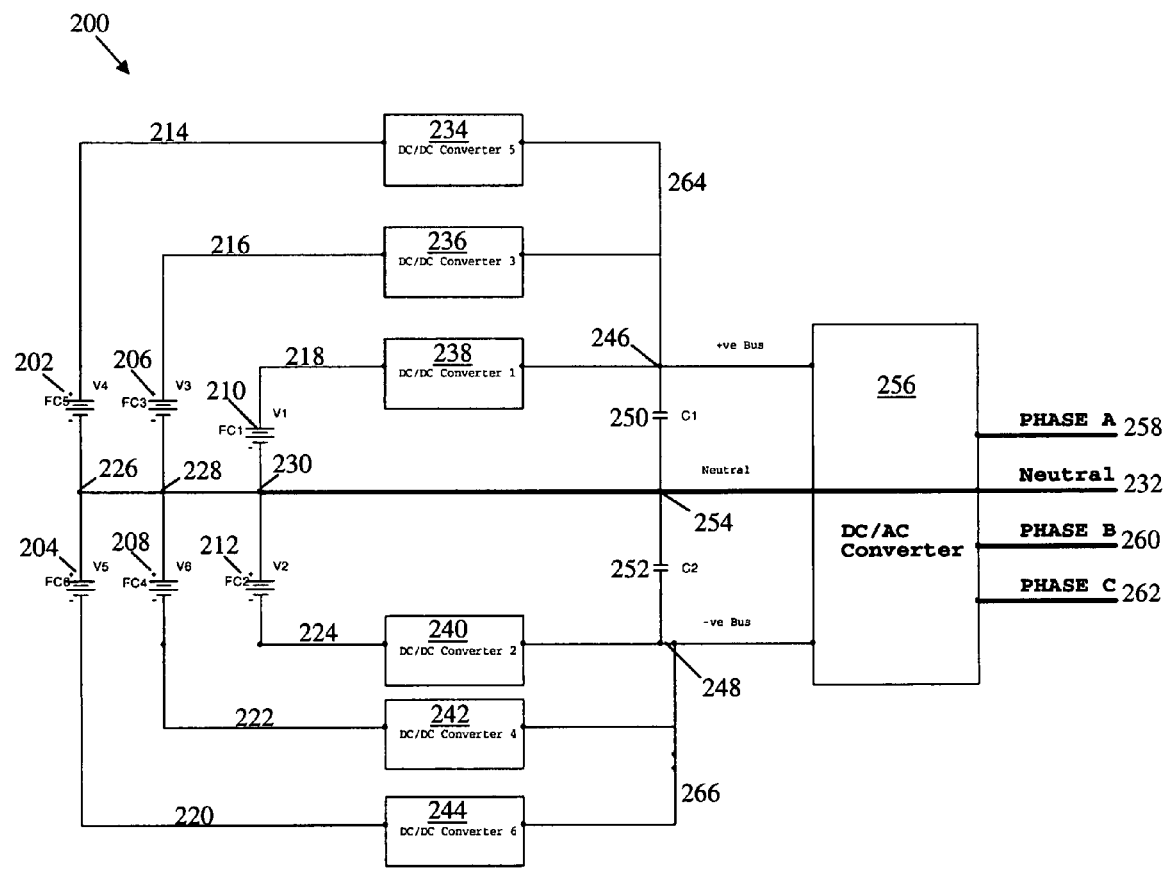
FIG. 2 is a block cell circuit diagram illustrating a second fuel cell power conversion system architecture embodiment.

Referring now to FIG. 2, a second embodiment in the form of a fuel cell power conversion system architecture 200 is shown. The architecture 200 may also be referred to as a power conversion module. The embodiment of FIG. 2 comprises three pairs of fuel cell segments. Fuel cell segments 202 and 204 are paired in an arrangement similar to that described with reference to FIG. 1. Fuel cell segments 206 and 208, as well as fuel cell segments 210 and 212 are also similarly paired. As an example, fuel cell segment 202 is connected with its negative terminal to node 226, while fuel cell segment 204 is connected with its positive terminal to node 226. Fuel cell segments 206 and 210 are also connected with their negative terminals to nodes 228 and 230 respectively. Nodes 228 and 230 are connected to nodes 226 and 254 as well as neutral line 232, and are at the same electrical potential. Fuel cell segments 208 and 212 are connected with their positive terminals to nodes 228 and 230 respectively.

Each fuel cell segment 202, 206 and 210 has an output bus 214, 216 or 218 respectively. The output busses feed fuel cell segment output to a DC/DC converter 234, 236 or 238, respectively. The DC/DC converters 234, 236 or 238 are generally boost converters and serve to bring the +ve output bus 264 to a voltage level with respect to neutral line 232 appropriate for the power system application. The negative terminals of fuel cell segments 204, 208 and 212 are also connected to output busses 220, 222 and 224 respectively, leading to DC/DC converters 244, 242 and 240 respectively. These DC/DC converters serve the same function as DC/DC converters 234, 236 and 238, albeit with an opposite polarity, bringing the voltage on −ve bus 266 to a suitably negative level with respect to neutral line 232.

The +ve bus 264 is joined at node 246, placing the DC/DC converters in a parallel circuit architecture. A voltage drop occurs at capacitor 250 to neutral line 232 at node 254. Capacitor 252 also serves to smooth out ripple currents produced by DC/DC converters 234, 236 and 238. Similarly, −ve bus 266 is joined at node 248, placing DC/DC converters 240, 242 and 244 in a parallel circuit architecture. A voltage increase occurs from node 248 over capacitor 252 to neutral line 232 at node 254. Capacitor 252 also serves to smooth out ripple currents from DC/DC converters 240, 242 and 244.

The +ve bus 264 and −ve bus 266 are connected as inputs to AC/DC converter or inverter 256. AC/DC converter or inverter 256 takes the two inputs with a DC voltage difference of +2 ve and creates a three phase output made up of phase A 258, phase B 260 and phase C 262. Each of the three phases is an AC signal with a 120 degree phase offset to each other phase and an RMS voltage with respect to neutral line 232 that is appropriate for the power system application.

Figure 3:
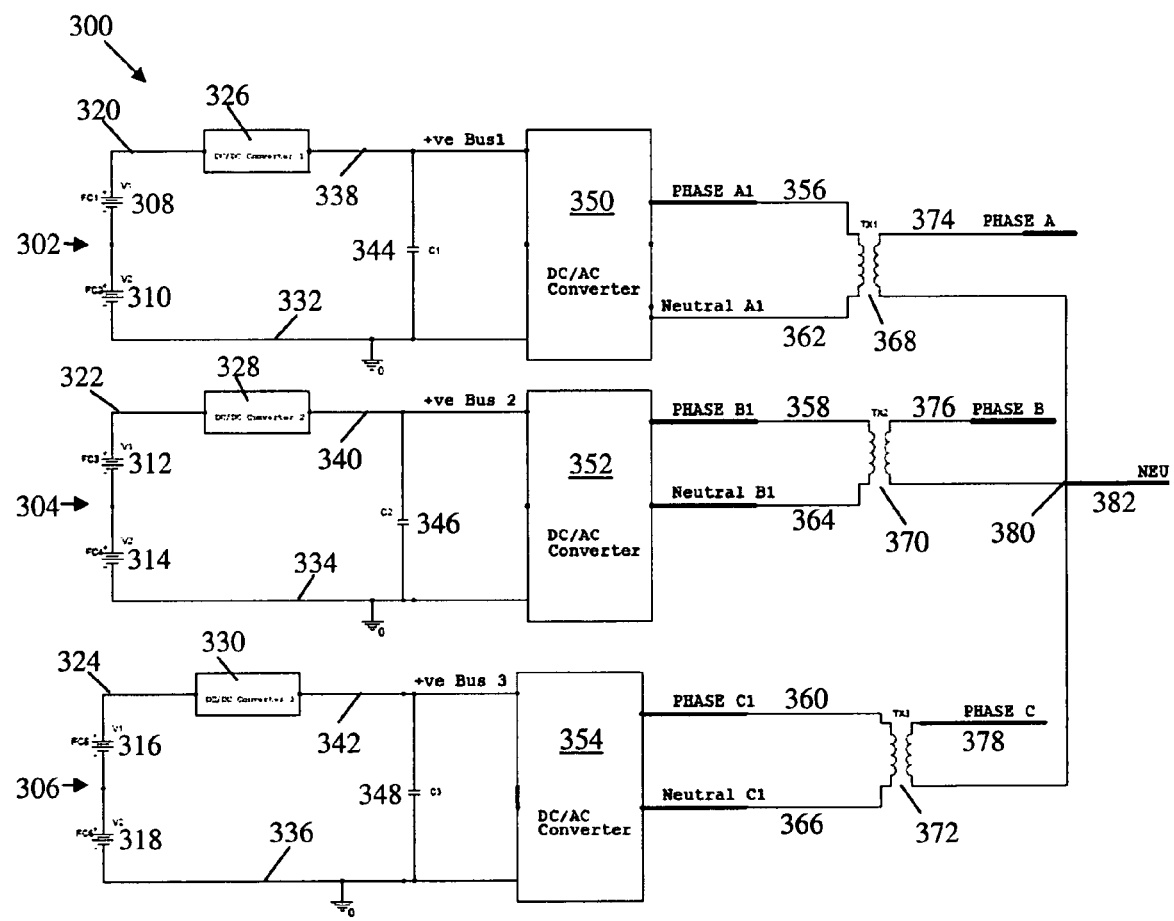
FIG. 3 is a block cell circuit diagram illustrating a third fuel cell power conversion system architecture embodiment.

The fuel cell power conversion system architecture 200 presents advantages in terms of modular design of the fuel system architecture. The architecture has adopted the dual bus architecture of the system of FIG. 1, with a neutral line derived from the middle node of the two fuel cell segment components. This architecture is multiplied by three in parallel for the embodiment of FIG. 2. That is, there are six parallel branches for DC/DC conversion, each containing a fuel cell segment pair in series with a neutral derived from the middle point of the pair. Thus, the fuel cell power conversion system of the embodiment of FIG. 2 are designed using integral multiples of six fuel cell segments per AC/DC converter or inverter. An integral multiple of 3 fuel cell segment pairs will make the power distribution along each phase easier and with minimum number of DC/DC converters. FIG. 3 shows a fuel cell power conversion system architecture 300 with output transformers for a four-wire (with neutral) system. The architecture shows a fuel cell power conversion system implementation with a single DC bus approach.

The system 300 comprises three parallel circuit branches 302, 304 and 306, each having a fuel cell segment pair 308 and 310, 312 and 314, or 316 and 318, respectively. Each fuel cell segment pair is connected in series so that their respective voltage increases are summed.

The outputs of fuel cell segments 308, 312 and 316 are connected to busses 320, 322 and 324 respectively, which lead to the inputs of DC/DC converters 326, 328 and 330, respectively. The negative terminal of the series connected fuel cell segments 308, 312 and 316 are connected to reference busses 332, 334 and 336 respectively, which are each connected to a reference potential such as ground. It is clear that a reference potential can be any relatively steady or convenient potential relative to non-reference lines.

The outputs of each DC/DC converter 326, 328 and 330 are each connected to +ve busses 338, 340 and 342 respectively. The +ve busses 338, 340 or 342 are connected to a capacitors 344, 346 and 348, respectively, which are in turn connected to reference busses 332, 334 and 336 respectively, to produce a voltage drop of +ve over each capacitor. The capacitors 344, 346 and 348 also serve to smooth ripple currents produced by DC/DC converters 326, 328 and 330 respectively.

The +ve busses 338, 340 and 342 and reference busses 332, 334 and 336 serve as inputs to DC/AC converters or inverters 350, 352 and 354 respectively. In contrast to the embodiments of FIGS. 1 and 2, each phase of the three-phase current output has its own DC/AC converter or inverter. The output of each DC/AC converter 350, 352 and 354 produces a respective phase signal 356, 358 or 360 respectively and a neutral line 362, 364 or 366 respectively. The use of three separate input branches for DC/AC inverter is particularly advantageous for the development of three-phase AC current, as each phase has its own neutral, positive and negative busses, that is, each of the three phases runs from its own DC bus.

The three phase outputs 356, 358 or 360 are transformed to an application RMS voltage by transformers 368, 370 and 372 respectively. The neutral line outputs from the transformers are connected at node 382 to generate a single neutral line.

The FIGS. also show in exemplary fashion methods that may be used for power generation and conditioning. For example, FIG. 1 demonstrates a method that may be used generally to convert the output of a direct current source to alternating current. As a first step, a first output 106 of a first series connection of two fuel cell segments (segments 102 and 104) is accepted at an input of a first DC/DC converter 110. A second output 108 of a first series connection of two fuel cell segments (segments 102 and 104) is accepted at an input of a second DC/DC converter 112. A first output 114 of the first DC/DC converter 110 is accepted at a first input 114 of a first inverter (i.e., DC/AC converter) 124. A first output 116 of the second DC/DC converter 112 is accepted at a second input 116 of the first inverter 124. A first AC output 126 is generated from the first and second inputs 114 and 116 of the first inverter 124 relative to a neutral line 122 connected to a reference potential.

Such a method may be expanded as shown in FIG. 2, wherein three fuel cell segment pairs are shown (including segments 202 and 204; 206 and 208; and 210 and 212 respectively), the outputs of each of which are accepted at the inputs of two DC/DC converters (234 and 244; 236 and 242 and 238 and 240 respectively) per fuel cell segment pair. The outputs of the DC/DC converters are electrically connected. The outputs of upper DC/DC converters 234, 236 and 238 are accepted at a first input of inverter 256, while the outputs of lower DC/DC converters 240, 242 and 244 are accepted at a second input of inverter 256. From these inputs, inverter 256 generates three phase outputs 258, 260 and 262 relative to neutral line 232.

Such a method may be also be expanded as shown in FIG. 3 to encompass multiple fuel cell stack segment pairs with corresponding DC/DC converters using a single inverter. Additionally, such methods may be used in the system of FIG. 3, wherein the first outputs 320, 322 and 324 respectively of multiple fuel cell stack segments (fuel cells 308 and 310; 312 and 314; and 316 and 318 respectively) are accepted at the inputs of DC/DC converters 326, 328 and 330 respectively. The outputs of the DC/DC converters and the second outputs of the fuel cell stack segments are in turn accepted at respective inverters (DC/AC converters) 350, 352 and 354. The inverters 350, 352 and 354 produce three phases 356, 358 and 360.

The foregoing embodiments of the invention are intended to be illustrative in nature and not limiting. It will be clear to a person of skill in the art that various modifications may be made without parting from the spirit and scope of the present invention, which should be defined only by the following claims.

What is claimed is:

1. A fuel cell circuit, comprising:
a first fuel cell segment having positive and negative terminals;
a second fuel cell segment having positive and negative terminals;
a neutral line;
wherein the negative terminal of the first fuel cell segment is electrically connected to both the positive terminal of the second fuel cell segment and the neutral line;
a third fuel cell segment having positive and negative terminals;
a fourth fuel cell segment having positive and negative terminals, wherein the negative terminal of the third fuel cell segment is electrically connected to both the positive terminal of the fourth fuel cell segment and the neutral line;
a first direct current-to-direct current (DC/DC) converter electrically connected to the positive terminal of the first fuel cell segment and a second DC/DC converter electrically connected to the negative terminal of the second fuel cell segment; and
a third DC/DC converter electrically connected to the positive terminal of the third fuel cell segment and a fourth DC/DC converter electrically connected to the negative terminal of the fourth fuel cell segment;
wherein an output of the first DC/DC converter is electrically connected to an output of the third DC/DC converter and to a first input of an inverter.

2. The apparatus of claim 1, wherein an output of the second DC/DC converter is electrically connected to an output of the fourth DC/DC converter and to a second input of the inverter.

3. The apparatus of claim 2, further comprising:
a fifth fuel cell segment having positive and negative terminals; and
a sixth fuel cell segment having positive and negative terminals, wherein the negative terminal of the fifth fuel cell segment is electrically connected to both the positive terminal of the sixth fuel cell segment and the neutral line.

4. The apparatus of claim 3, further comprising a fifth DC/DC converter electrically connected to the positive terminal of the fifth fuel cell segment and a sixth DC/DC converter electrically connected to the negative terminal of the sixth fuel cell segment.

5. The apparatus of claim 4, wherein:
an output of the fifth DC/DC converter is electrically connected to the output of the first DC/DC converter, to the output of the third DC/DC converter, and to the first input of the inverter; and
an output of the sixth DC/DC converter is electrically connected to the output of the second DC/DC converter, to the output of the fourth DC/DC converter, and to the second input of the inverter.

6. The apparatus of claim 1, wherein the first fuel cell segment comprises a plurality of fuel cell stacks individually wired to be connected in series.

7. The apparatus of claim 1, further comprising first and second capacitors, the first capacitor connected between the output of the first DC/DC converter and the neutral line; the second capacitor connected between the output of the second DC/DC converter and the neutral line.

8. A power conversion module, comprising:
a plurality of DC/DC converter branches, each branch comprising a DC/DC converter, wherein each DC/DC converter branch comprises an output bus, wherein each of the DC/DC converter branch output busses is electrically connected to another DC/DC converter branch output bus, and wherein each of the DC/DC converter branch output busses is electrically connected to an inverter input; and
a plurality of series connections comprising two fuel cell segments;
wherein each DC/DC converter branch is connected to at most one series connection comprising two fuel cell segments;
wherein the total number of DC/DC converter branches is an integer multiple of three;
wherein the DC/DC converter branches are divided into groups of two, the groups of two being defined in that each DC/DC converter branch in the group is connected to the same series connection of two fuel cell segments; and
wherein each series connection comprising two fuel cell segments comprises a connection node connecting exactly two fuel cell segments, wherein the connection nodes of all of the series connections of exactly two fuel cell segments are electrically connected, and wherein a neutral line of a three phase current output is electrically connected to the connection node of one of the series connections of exactly two fuel cell segments.

9. The power conversion module of claim 8, wherein the total number of DC/DC converter branches is an integer multiple of six.

10. A fuel cell power conversion system comprising a plurality of power conversion modules of claim 8.

11. The power conversion module of claim 8, wherein one half of the fuel cell segments are located on a positive side of a neutral line and a remaining one half of the fuel cell segments are located on a negative side of the neutral line.

12. A method for converting DC to AC, comprising:
- accepting a first output of a first series connection comprising two fuel cell segments at an input of a first DC/DC converter;
- accepting a second output of the first series connection comprising two fuel cell segments at an input of a second DC/DC converter;
- accepting a first output of the first DC/DC converter at a first input of a first inverter;
- accepting a first output of the second DC/DC converter at a second input of the first inverter;
- accepting a first output of a second series connection comprising two fuel cell segments at an input of a third DC/DC converter;
- accepting a second output of the second series connection comprising two fuel cell segments at an input of a fourth DC/DC converter;
- accepting a first output of the third DC/DC converter at the first input of the first inverter;
- accepting a first output of the fourth DC/DC converter at the second input of the first inverter; and
- generating first and second AC outputs from the first and second inputs of the first inverter relative to a neutral line connected to a reference potential.

13. The method of claim 12, further comprising:
- accepting a first output of a third series connection comprising two fuel cell segments at an input of a fifth DC/DC converter;
- accepting a second output of a third series connection comprising two fuel cell segments at an input of a sixth DC/DC converter;
- accepting a first output of the fifth DC/DC converter at the first input of the first inverter;
- accepting a first output of the sixth DC/DC converter at the second input of the first inverter; and
- generating a third AC output from the first and second inputs of the first inverter relative to the neutral line.

* * * * *